US009259672B2

(12) United States Patent
Zickert

(10) Patent No.: US 9,259,672 B2
(45) Date of Patent: Feb. 16, 2016

(54) APPARATUS FOR THE TRANSPORT OF SLUDGE

(75) Inventor: Klaus Zickert, Kungsbacka (SE)

(73) Assignee: K ZICKERT FORVALTNINGS AB, Kunksbacka (SE)

( * ) Notice: Subject to any disclaimer, the term of this patent is extended or adjusted under 35 U.S.C. 154(b) by 323 days.

(21) Appl. No.: 13/579,988

(22) PCT Filed: Feb. 21, 2011

(86) PCT No.: PCT/SE2011/000033
§ 371 (c)(1),
(2), (4) Date: Aug. 20, 2012

(87) PCT Pub. No.: WO2011/105947
PCT Pub. Date: Sep. 1, 2011

(65) Prior Publication Data
US 2012/0318733 A1     Dec. 20, 2012

(30) Foreign Application Priority Data

Feb. 23, 2010 (SE) ...................................... 1000172

(51) Int. Cl.
*B01D 21/18* (2006.01)
*E02F 3/46* (2006.01)
*E02F 9/02* (2006.01)

(52) U.S. Cl.
CPC .............. *B01D 21/18* (2013.01); *B01D 21/183* (2013.01); *E02F 3/46* (2013.01); *E02F 9/022* (2013.01)

(58) Field of Classification Search
CPC ...... B01D 21/18; B01D 21/183; B01D 21/24; B01D 21/245; B01D 21/2455; E02F 3/46; E02F 9/02; E02F 9/022; E02F 9/026
USPC ..................................... 210/527, 523; 37/342
See application file for complete search history.

(56) References Cited

U.S. PATENT DOCUMENTS

| 2,259,230 | A | * | 10/1941 | Scott | 210/529 |
| 2,309,556 | A | * | 1/1943 | Walker | 210/526 |
| 2,866,557 | A | * | 12/1958 | Easterday | 210/527 |
| 4,138,343 | A | * | 2/1979 | Bologna | 210/526 |

(Continued)

FOREIGN PATENT DOCUMENTS

| CN | 1404897 | | 3/2003 |
| CN | 200957313 | Y | 10/2007 |
| CN | 201175598 | Y | 1/2009 |
| CN | 101590334 | A * | 12/2009 |
| JP | 2002219307 | | 8/2002 |
| JP | 2002219307 | A * | 8/2002 |
| JP | 2008302329 | | 12/2008 |
| JP | 2008302329 | A * | 12/2008 |
| KR | 681251 | B1 * | 2/2007 |

OTHER PUBLICATIONS

International Search Report, corresponding to PCT/SE2011/000033, mailed May 24, 2011.
Written Opinion of the International Searching Authority, corresponding to PCT/SE2011/000033, mailed May 24, 2011.

*Primary Examiner* — Joseph Drodge
(74) *Attorney, Agent, or Firm* — Renner, Otto, Boisselle & Sklar, LLP.

(57) ABSTRACT

The present invention relates to a transporting apparatus comprising a sludge scraping and sludge transporting arrangement comprising primarily a scraping and transport element to be arranged in a simple and rational way in a sedimentation basin in water treatment plants, characterized of a) a series of sliding tracks to be arranged to the bottom of a sedimentation basin, b) a drawing rod to be arranged for a to- and fro movement, c) at least two outer rods arranged in parallel to said drawing rod.

7 Claims, 4 Drawing Sheets

(56) References Cited

U.S. PATENT DOCUMENTS

| | | | |
|---|---|---|---|
| 4,535,494 A * | 8/1985 | Diamonstein | 5/400 |
| 5,392,488 A * | 2/1995 | Li | 15/250.41 |
| 5,431,818 A * | 7/1995 | Zickert | 210/527 |
| 5,460,707 A * | 10/1995 | Wellerdieck | 204/298.08 |
| 6,126,019 A * | 10/2000 | de la Cour | 210/525 |
| 6,199,704 B1 * | 3/2001 | Fujiwara | 210/525 |
| 6,625,935 B1 * | 9/2003 | King et al. | 52/36.6 |
| 7,780,015 B1 * | 8/2010 | Brauch et al. | 210/524 |
| 2002/0121476 A1 | 9/2002 | Wang | |
| 2006/0124539 A1 * | 6/2006 | Fujiwara | 210/527 |

* cited by examiner

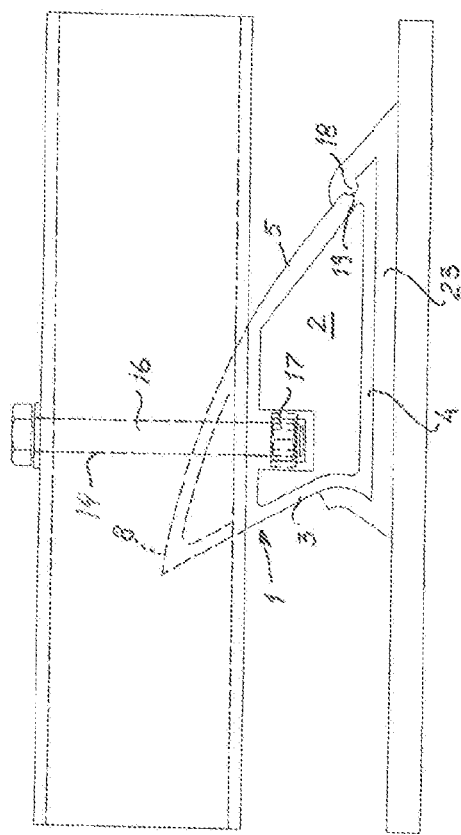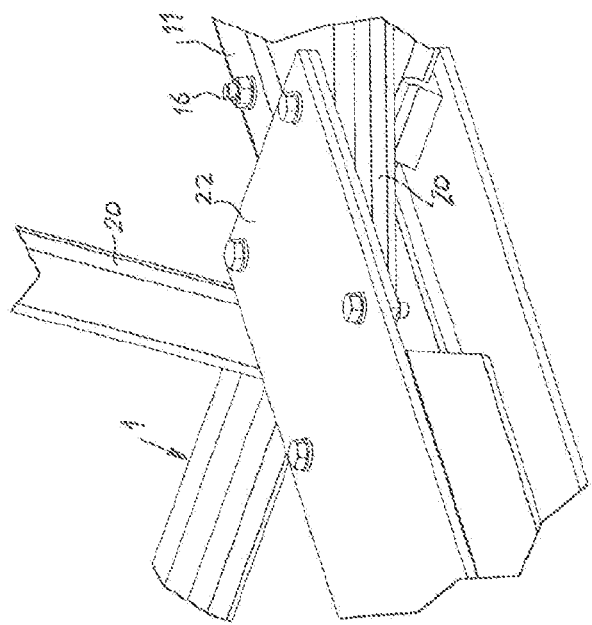

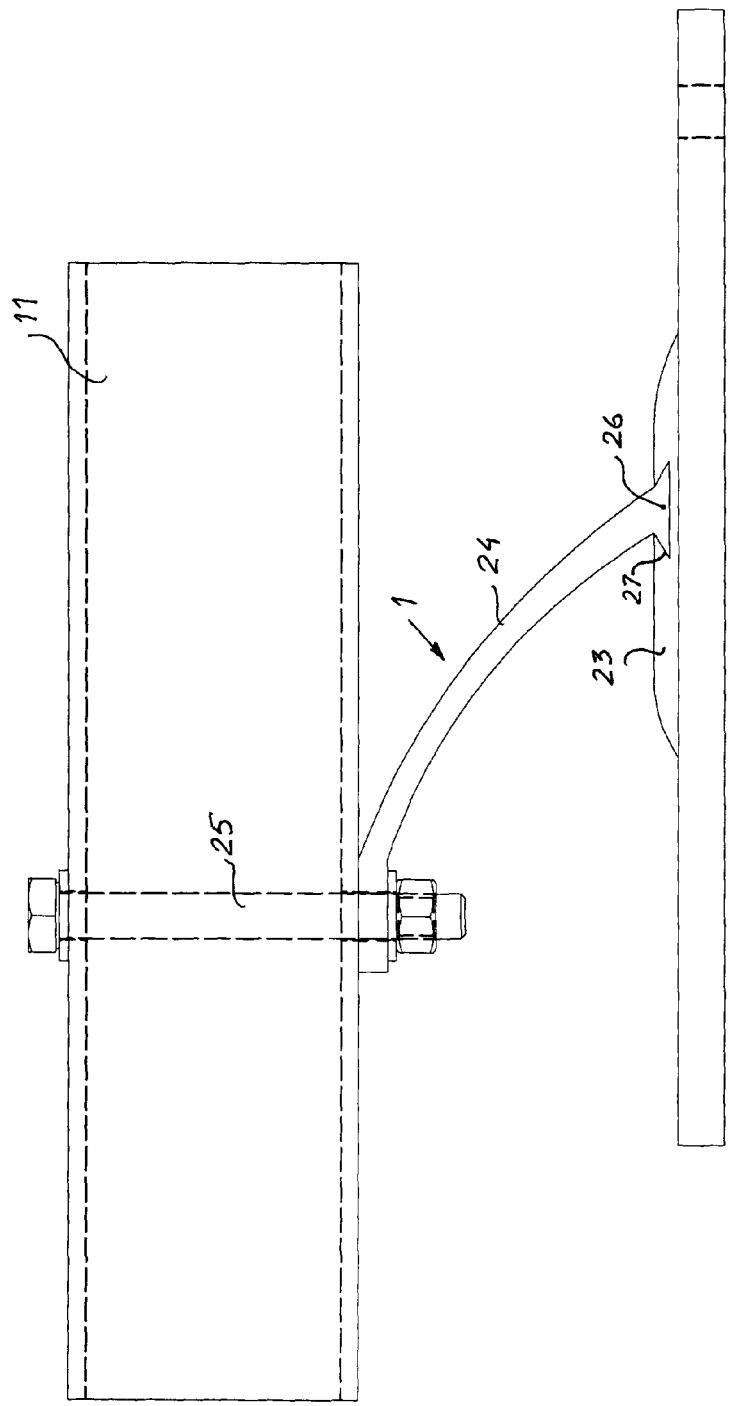

APPARATUS FOR THE TRANSPORT OF SLUDGE

TECHNICAL FIELD

The present invention concerns an apparatus for scraping, transport and collection of sludge, comprising primarily a scraping and transport element to be arranged in a simple and rational way in a sedimentation basin in water treatment plants, said plants comprising sedimentation basins with slurry collection troughs and/or slurry processing plants.

BACKGROUND OF THE INVENTION

The use of cable-drawn scrapers or scraping apparatus has also been suggested, in which one or more cables pull a wagon or sledge which holds the scraper at or near the bottom of the basin in a repeating to-and-fro motion. (SE-B-423 968; U.S. Pat. No. 2,866,557; U.S. Pat. No. 2,768,749; U.S. Pat. No. 4,090,966; GB-A-1 504 518). The technology is an improvement over the state of the art concerning chain-driven scrapers, in that it has a significantly simpler, lighter and cheaper construction. Meanwhile, the system means that different equipment must be used to turn the scraper blade and control its rotation from a vertical to a horizontal position and vice versa under the reciprocating movement caused by the cables. The scraper blade, which comprises a metal blade which is arranged with its edge in the transport direction and most often is provided with a rubber edging strip, extends across the width of the basin, at right angles to the direction of transport. Under the reciprocating movement of the scraper blade, the slurry is stirred up, however, to give so-called sludge escape, due to turbulence building up behind the blade and maximum efficiency cannot therefore be reached. The loads on the apparatus also mean that it must be made of metal, and to prevent corrosion from eating away the apparatus too quickly, it must be manufactured in a more acid-resistant material, which increases costs.

An apparatus in a sedimentation basin and the like for displacement of slurry and sediment collected on the bottom of the basin is known from SE-C-454,140, in which transport means is arranged to be moved back and forth near the bottom of the basin, whereby slurry and sediment is displaced by the reciprocating movement to one end of the basin, whereby the transporter consists of a mat comprising means with a wedge-shaped triangular cross-section, said means being arranged substantially perpendicular to the direction of travel of the transporter, and the point of the wedge is arranged in the return direction while the base of the wedge is arranged in the forward direction.

A transport element of a reciprocating scraper is also known from EP-B-0 532 484 for moving slurry in sedimentation basins and the similar objects in water purification plants, said element having a cross-section which has a downwardly-facing surface, a substantially curved convex surface and a substantially vertical concave surface, said concave surface being arranged in the forward, transporting direction.

All transport of slurry takes place with these elements placed in a perpendicular relationship to the longitudinal direction of the transporter, either a chain, net or rod move over the bottom of the sedimentation basin, whereby the chain moves continuously in one direction, and the net and rod move back and forth.

Previous transport elements have always been welded to longitudinally directed draw track, net and the similar on the top of these, which welding on one hand requires special training for the authorization of personal skilled in welding, and on the other hand creates tensions between the different materials, which leads to the fact that the transporting element bends and thereby carry out a less efficient transport. Often layers of sludge are built up underneath the transporting element, which sludge will not become transported but will become compressed and lifts the whole scraping transporter.

SUMMARY OF THE INVENTION

It is an aim of the present invention to provide an apparatus which meets these problems and creates an easily assemblable transporting apparatus with a retained shape after the assembly. This is possible using a construction which allows a simple combination of a plurality of elements to reduce space, at the same time as providing a rational mounting arrangement.

DETAILED DESCRIPTION OF THE INVENTION

It has now surprisingly been found possible to meet these requirements and solve these problems by means of the present invention, which relates to a sludge scraping and transporting arrangement comprising primarily a scraping and transporting element to be arranged in a simple and rational way in a sedimentation basin at water cleansing plants, whereby the transporting apparatus comprises a) a series of sliding tracks to be arranged to the bottom of a sedimentation basin, b) a drawing rod to be arranged for a to- and fro movement, c) at least two outer rods arranged in parallel to said drawing rod, d) at least four braces arranged in pair to and in between the outer rods and the drawing rod, as well as e) a series of transporting elements arranged to the undersides of said drawing rod, outer rods and the braces.

Suitably friction reducing elements arranged to the transporting elements are arranged to abut said sliding tracks.

As a matter of weight the transporting elements consist of hollow bodies fixedly arranged to each other, whereby friction reducing elements arranged to the hollow bodies are arranged to abut said sliding tracks.

The hollow bodies are fixedly arranged to each other by means of a joint of a groove and a locking shoulder.

Said outer rods are fixedly arranged to a first hollow body by means of a bolt joint of a groove and a locking shoulder.

In an alternative embodiment of the transporting element these consist of a solid body being concavely shaped in its transporting direction, which elements are arranged to be fixedly arranged to said drawing rod, outer rods and braces using screw joints.

The shape of the transporting element means that it will have an open triangular, or wedge shaped cross-section in the transporting direction after having been mounted into a sludge basin.

The invention will now be described in more detail in the following, with reference to the appended drawings, in which:

FIG. 4 shows a perspective view of a detail of the fastening of distance braces between outer rods and central drawing rod at said drawing rod in an embodiment according to the present invention;

FIG. 5 shows a detail of the fastening of a drawing rod; and

FIG. 6 shows an alternative design of a transporting element of the transporting apparatus according to the invention.

Figure 1:
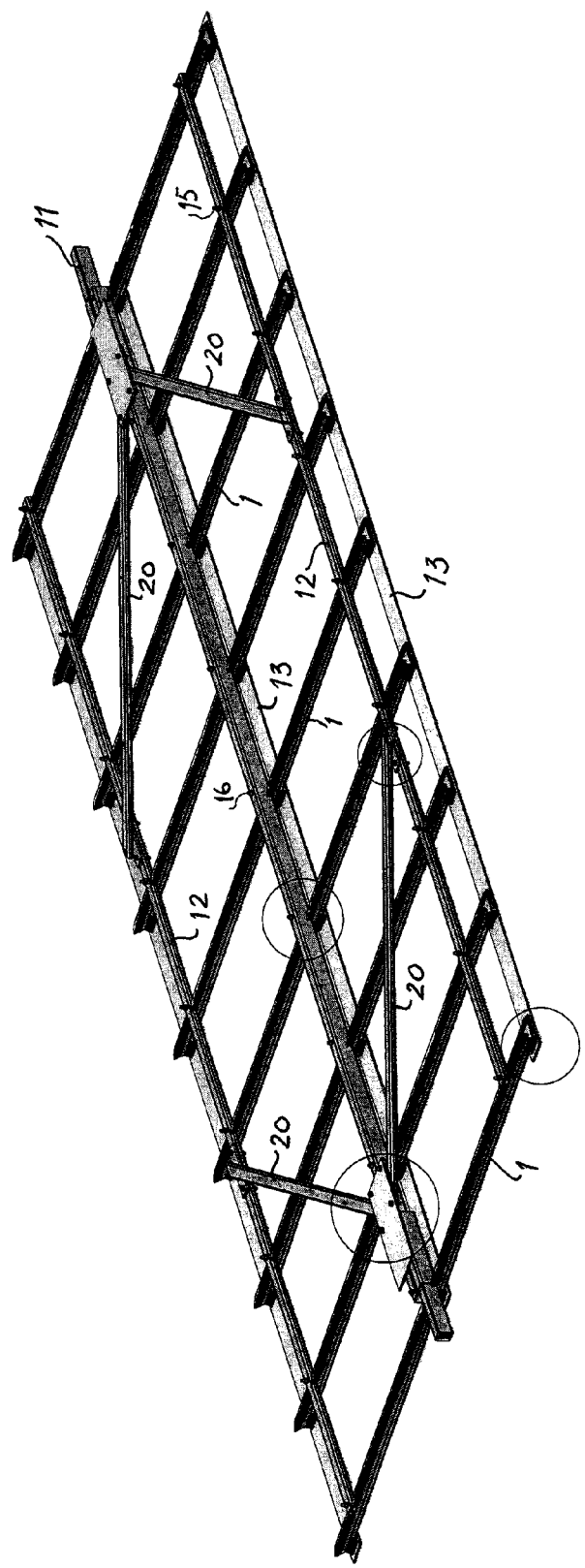
FIG. 1 shows a perspective view of a scraping and transporting apparatus according to the present invention.
Figure 3:
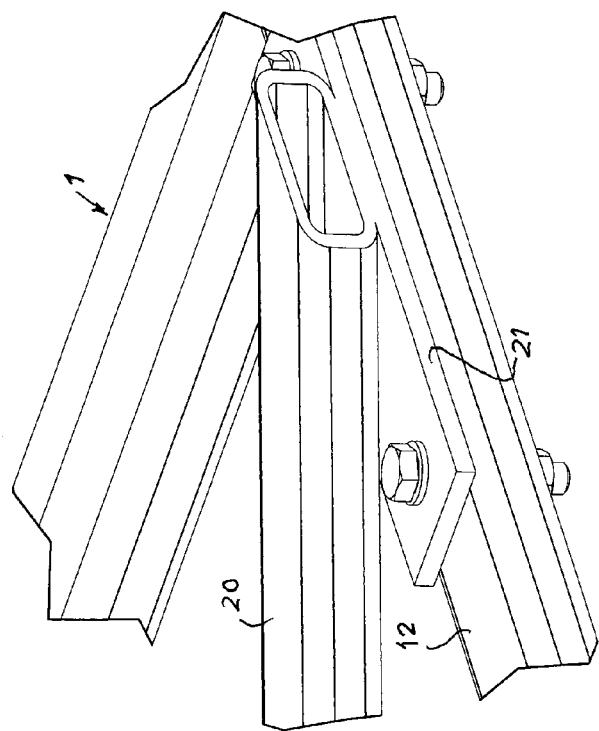
FIG. 3 shows a perspective view of a detail of the fastening of distance braces between outer rods and central drawing rod at said outer rods in an embodiment according to the present invention.

The present invention is, in a preferred embodiment a sludge transporting apparatus generally with a number of transporting elements 1, a drawing rod 11, two outer rods 12 running in parallel to said drawing rod 11, four braces 20 arranged between said drawing rod 11 and said outer rods 12, as well as three sliding tracks 13, which latter are attached to the bottom of the sludge basin. The drawing rod 11 is connected to an engine (not shown) to provide a to and fro movement. Normally the width and length of the transporting apparatus is adapted to the sludge basing to become provided with a transporting apparatus. In the case of very broad basins one may place two or more transporting apparatuses next to each other and have them work in parallel.

Figure 2:
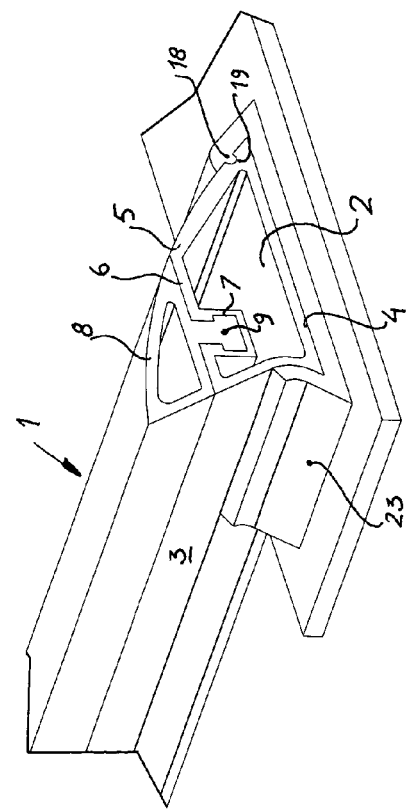
FIG. 2 shows a perspective view of a scraping and transporting apparatus according to the present invention as well as a mounting device.

1 denotes in FIGS. 1, 2 and 5 generally a transporting element of a sludge basin, which element comprises a lower horizontal hollow body 2, such as a profile having been extrusion pressed from aluminum, which profile comprises a forwardly inclined transporting surface 3, a lower horizontal bottom 4, a rear back surface 5 being forwardly inclined as well, as well as an upper surface 6 provided with a groove 7. The inclined transporting surface 3 is herein said to be inclined in relation to a thought horizontal plane. Further the transporting element a top element 8, such as a profile having been extrusion pressed from aluminum, which top element is provided with a locking shoulder 9 adapted to be able to be introduced in the groove 7 to a tight abutment between the hollow body 2 and the top element 8. The top element 8 connects in its shape to the hollow body 2 to the formation of a final transporting element 1 having, in this embodiment, the shape of a "shark fin", which will be more evident in detail from FIGS. 2 and 5. In a cross-section the groove 7 has the form of an upwardly directed truncated triangle or the shape of lower quadratic part and an upper quadratic part having a smaller cross-section compared to the lower one. The aim is to obtain a locking or tight fitting to a locking shoulder 9 being introduced into the groove 7, which locking shoulder has a corresponding shape. The transporting element 1 is suitably made of aluminum, as mentioned above, or of a steel quality, such as preferably stainless steel or acid-proof stainless steel.

The transporting apparatus is mounted in a simple manner against the sliding tracks 13 by placing the transporting elements across the basin at equal distances from each other, a distance which basically is determined by the expected amount of sludge to be transported. The distance between the transporting elements is defined by vertical holes 14, 15 arranged in the outer rods 12 and the drawing rod, which holes are intended to receive locking bolt joints 16 having a locking shoulder 17. When the hollow bodies 2 of the transporting elements 1 have been displaced the locking shoulder 17 of the bolt joint 16 of the drawing rod 11 into the groove 7 of the hollow body 2 of the respective transporting element 1, whereby the drawing rod 11 will be placed into the upper part of the transporting element 1, whereby the top element 8 with its locking shoulders 9 are introduced into the hollow bodies 2. Thereby these top elements 8 have a length which occupies the distance between the drawing rod 11 and the outer rod 12. Then the outer rods 12 with its bolt joints 15 having its locking shoulder 17 are introduced into the hollow body 2, whereby the outer rods 12 will be placed in the upper part of the transporting element 1. Outside the outer rods 12 further top elements 8 are introduced.

To maintain the parallelism in longitudinal direction as well as in cross-direction the transporting apparatus has as shown in the embodiment shown four braces 20 placed in pair between the outer rods 12 and the drawing rod 11. The braces 20 are fixedly mounted by means of screw joints to the outer rods 12 via fastening brick 21 and by means of screw joints to the drawing rod 11 via a further fastening brick 22.

A friction reducing element 23 is arranged between the transporting elements 1 and the sliding tracks 13. This friction reducing element 23 is preferably made of a polymer material. The friction reducing element 23 is locked against the transporting element 1 by means of a snap joint wherein a rib 18 of the friction reducing element 23 is snapped into a corresponding groove 19 of the back surface 5. The friction reducing element 23 is clamped over the lower horizontal bottom 4 of the hollow body 2 and up against its forwardly inclined transporting surface 3, as well as its rear forwardly directed back surface 5.

In an alternative embodiment (FIG. 6) of the transporting element it is made of a solid, in its transporting direction, arcuate body 24 arranged to be fixed to said drawing rod 11, outer rods 12 and braces 20 by means of a screw joint 25. The friction reducing element 23 is locked to the arc shaped body 24 by means of a snap joint where a foot 26 of the arc shaped body 24 is snapped into a corresponding groove 27 in the friction reducing element 23.

By means of the present invention a simple mounting in a sludge basin can be achieved and further that tensions which leads to bendings are eliminated. As the drawing rod is placed in the upper part of the construction the transporting elements 1 are provided with a load which provides an even transport of sludge, as the transporting elements partly is forced down against the bottom of the basin with an even pressure.

The invention claimed is:

1. A transporting apparatus comprising a sludge scraping and sludge transporting arrangement comprising primarily a scraping and transport element to be arranged in a sedimentation basin in water treatment plants, including
   a) a series of sliding tracks to be attached to the bottom of a sedimentation basin,
   b) a drawing rod to be arranged for a to- and fro movement,
   c) at least two outer rods arranged in parallel to said drawing rod,
   d) at least four braces arranged in pair to and between the outer rods and the drawing rod, and
   e) a series of transporting elements arranged to the undersides of said drawing rod, said outer rods and the braces.

2. A transporting apparatus according to claim 1, wherein friction reducing elements arranged relative to the transporting elements are arranged to abut said sliding tracks.

3. A transporting apparatus according to claim 1, wherein at least a first transporting elements comprises a lower horizontal hollow body and a top element hollow body, which said top element hollow body is fixedly attached to said lower horizontal body.

4. A transporting apparatus according to claim 3, wherein the lower horizontal hollow body and top element hollow body are fixedly attached to each other by means of a joint of a groove and a locking shoulder.

5. A transporting apparatus according to claim 1, wherein said drawing rod is fixedly attached to the lower horizontal hollow body by means of a bolt joint of a groove and a locking shoulder.

6. A transporting apparatus according to claim 1, wherein said outer rods are fixedly attached to the lower horizontal hollow body by means of a bolt joint of a groove and a locking shoulder.

7. A transporting apparatus according to claim 1, wherein the transporting element includes a solid body being concavely arc shaped in its transporting direction, which element is arranged to be fixedly attached to said drawing rod, outer rods and braces using screw joints.

* * * * *